United States Patent [19]

Sheipline

[11] Patent Number: 5,680,737
[45] Date of Patent: Oct. 28, 1997

[54] STRUCTURAL CONNECTOR HUB FOR EXHIBIT BOOTHS

[76] Inventor: Gary D. Sheipline, 1670 York St., San Jose, Calif. 95124

[21] Appl. No.: 601,342

[22] Filed: Feb. 16, 1996

[51] Int. Cl.⁶ .................................................. F16B 7/00
[52] U.S. Cl. .................. 52/655.1; 52/656.9; 403/169; 403/205; 403/217; 403/409.1
[58] Field of Search ................................. 403/169, 170, 403/171, 174, 175, 176, 178, 217, 218, 219, 205, 403, 409.1; 52/655.1, 656.9

[56] References Cited

U.S. PATENT DOCUMENTS 4,934,858  6/1990  Beaulieu .......................... 403/178 X Primary Examiner—Robert Canfield
Attorney, Agent, or Firm—Thomas E. Schatzel; Law Offices of Thomas E. Schatzel A Prof. Corporation

[57] ABSTRACT

A strutural connector hub for an exhibit booth. The connector hub provides for a double friction fit connector to secure various components together in place and further provides for a lock to additionally secure various components thereto.

10 Claims, 7 Drawing Sheets

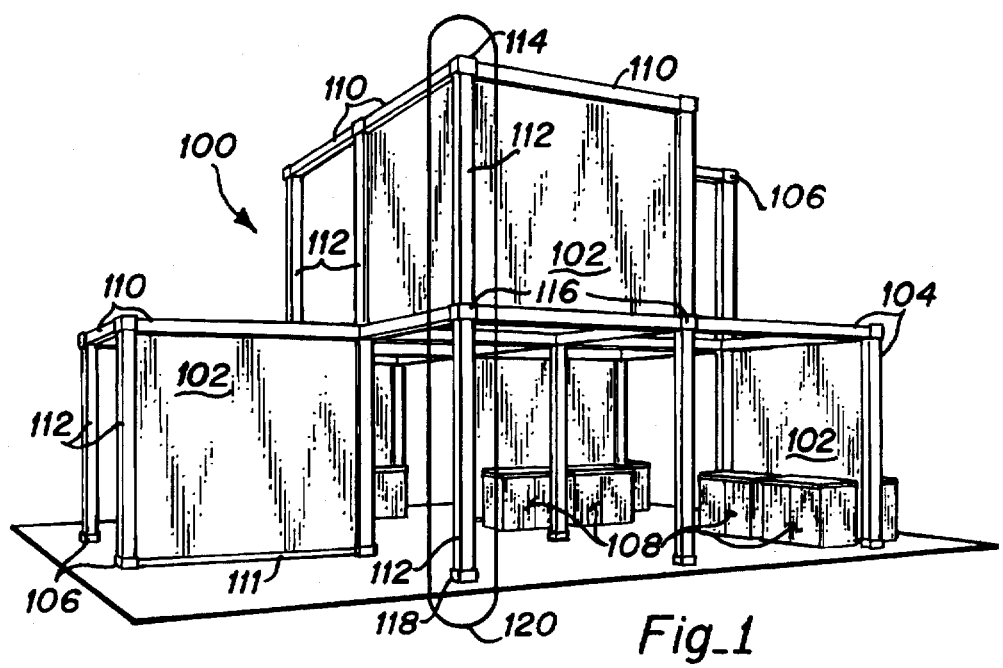
Fig_1
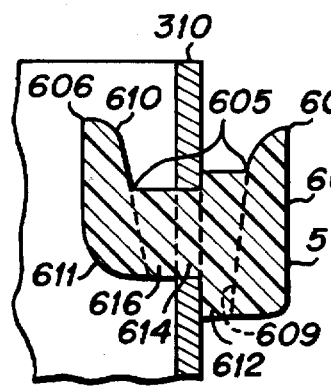
Fig_6A
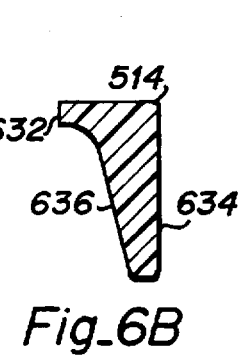
Fig_6B
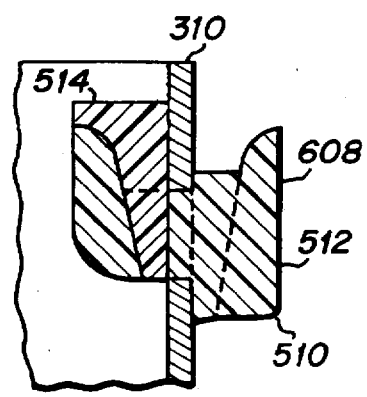
Fig_6C
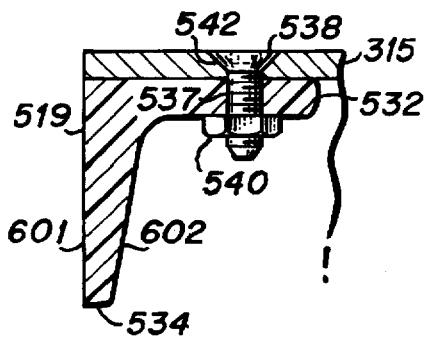
Fig_6D
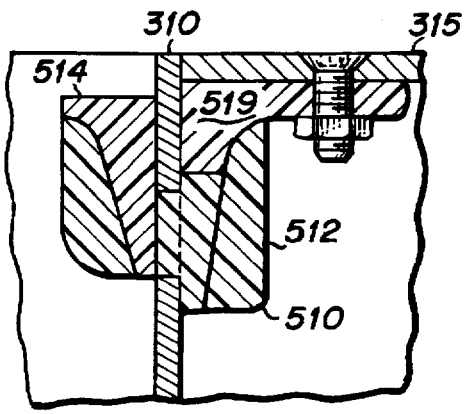
Fig_6E Fig_3

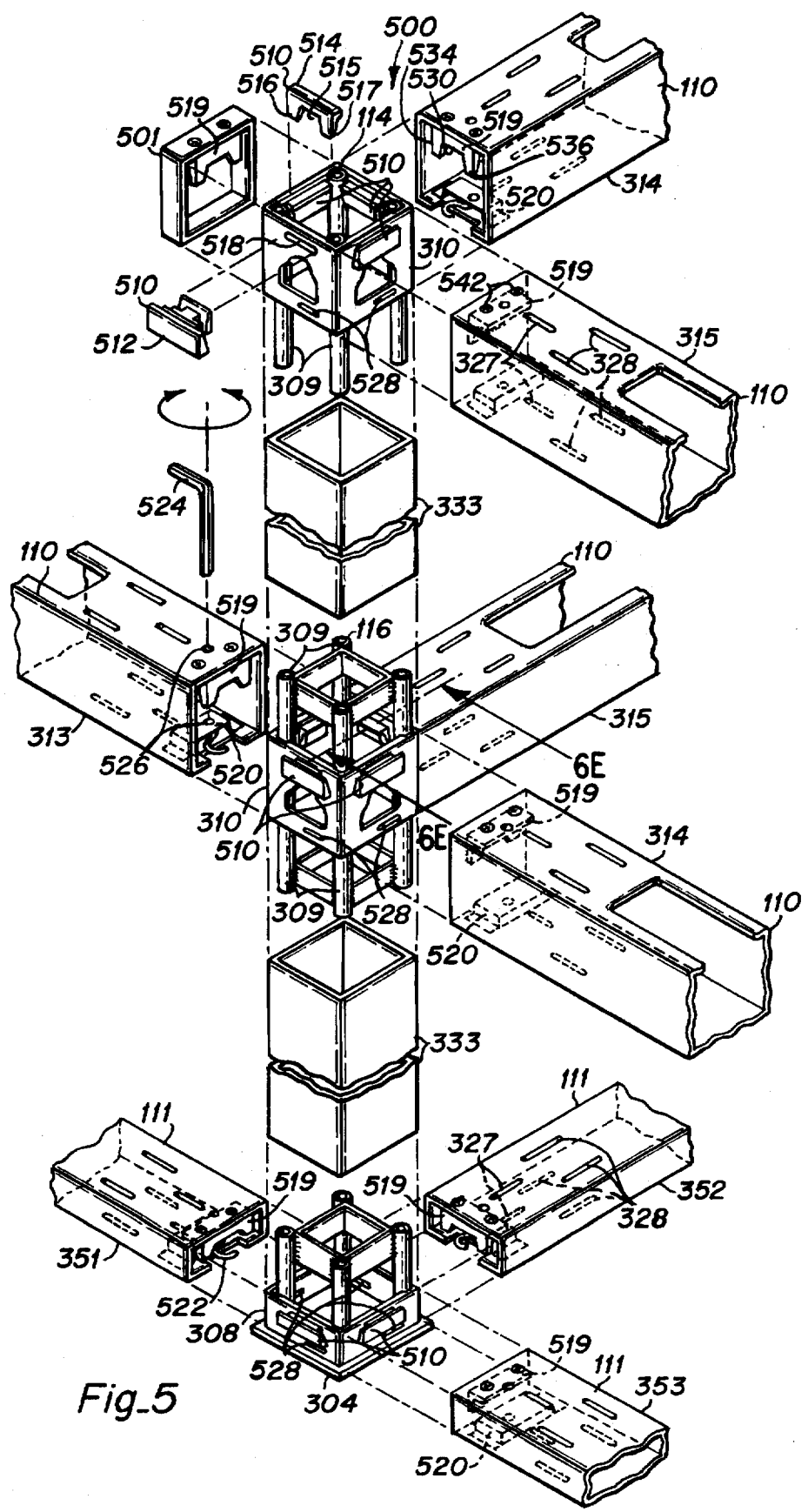
Fig_5

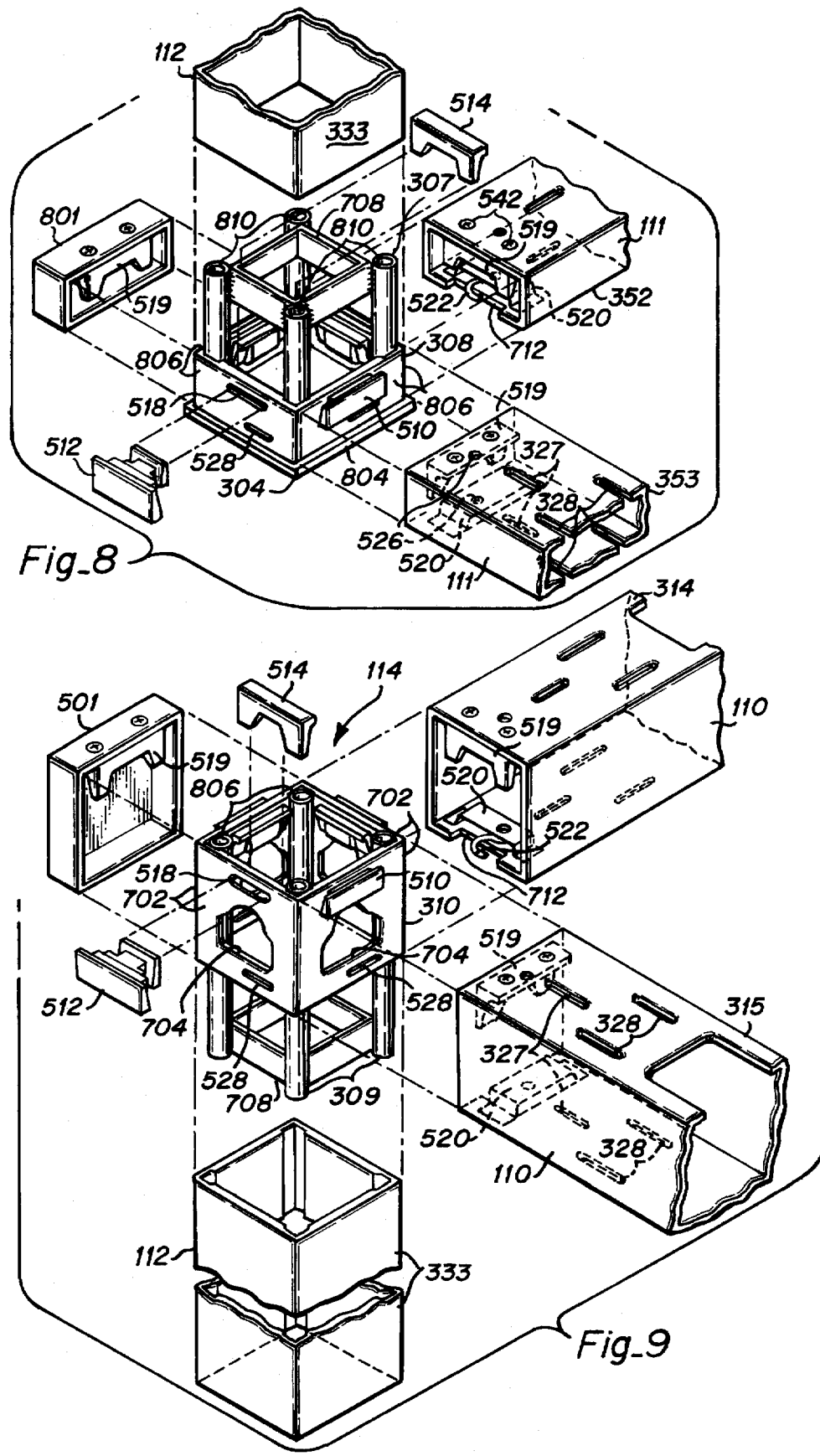

5,680,737

STRUCTURAL CONNECTOR HUB FOR EXHIBIT BOOTHS

BACKGROUND OF THE INVENTION

1. Field of the Invention

The present invention relates generally to trade show exhibits booths and more particularly to the structural frame of exhibiting booths.

2. Description of the Prior Art

Structural framing may be categorized as being fixed, semi-fixed, or temporary. Examples of fixed structural framing are a the frames of homes and high rise office buildings. In a home, a wooden frame is generally nailed together and may take months to piece together and days to tear it down. In a high rise office building, a steel frame is generally used which usually is bolted, rivetted, or welded together and may take years to construct and weeks to tear it down.

An example of semi-fixed structural framing is office cubicles. The modular components used in the construction of office cubicles may be pieced together to create a semi-fixed structural framed walls. The use of office cubicles is generally limited to dividing space and do not support heavy objects.

An example of a temporary structural frame is scaffolding. Scaffolding comprises aluminum cylindrical tubing that is joined together by using aluminum connectors. Generally the tubing and connectors are bolted together by clamping to one another. The time to construct scaffolding varies with its size. Scaffolding is generally used to temporarily support construction workers while work is performed in an elevated area.

Another area where temporary structural framing is needed is in exhibition booths, e.g. trade show booths. In putting on a trade show, it is necessary to set up multiple booths so that exhibitors have a designated area on the show floor in which to show there wares. Usually trade shows are held in convention centers and the like and require that the booths be quickly installed and be quickly disassembled in order to maximize the revenue or cost of labor that may be generated for renting space. It is desirable to have temporary structural framing with improved assembly and disassembly features.

Construction of trade show booths usually requires multiple tools such as multiple screwdrivers, hammers, saws, drills and wrenches in order to be set up. The need for multiple tools slows down the assembly process. Misplacing, or not having available, one of the multiple tools used in construction may further slow the assembly process. The cost of skilled labor and the additional rental time for assembly and disassembly is a significant economical concern. Thus, it is desirable to reduce the number of tools used to construct trade show booths and the required time for assembly and disassembly. Also, it is desirable to have a structure which when disassembled can be packaged in a compact package for transport from site to site.

SUMMARY OF THE INVENTION

It is an object of the present invention to provide exhibit booth components which allow for rapid assembly and disassembly of trade show exhibit booths of various size (sq. footage) and multiple levels.

Another object of the present invention is to provide exhibit booth components which may be standardized for use in building trade show exhibit booths for consistency and reuse of graphic panels.

A still further object of the present invention is to provide exhibit booth components which minimize the number of tools needed in the construction of trade show exhibit booths.

Briefly, the present invention includes modular components for assembly of trade show booths. Particularly a connector module is provided that uses a friction locking mechanism to hold the joints of the various components together and require the use of only one tool. An S-lock is provided for locking the various architectural components to a connector module.

An advantage of the present invention is that trade show exhibit booths may be quickly assembled and disassembled.

Another advantage of the present invention is that standard components may be used to construct various sizes and multiple height trade show exhibit booths over and over. A further advantage of the present invention is that a single tool may be utilized to assemble the components of a trade show exhibit booth.

These and other objects and advantages of the present invention will no doubt become obvious to those of ordinary skill in the art after having read the following detailed description of the preferred embodiment which is illustrated in the various drawing figures.

IN THE DRAWINGS

FIG. 1 is a perspective view of an assembled trade show exhibit booth incorporating the present invention;

FIG. 5 is an exploded view of a column of FIG. 1;

FIGS. 6A–6E are cross sectional views of the connector as illustrated in FIG. 5;

FIG. 8 is an exploded view of a post sill connector of FIG. 5; and

FIG. 9 is an exploded view of a cap connector hub of FIG. 5.

DETAILED DESCRIPTION OF THE PREFERRED EMBODIMENT

Figure 2:
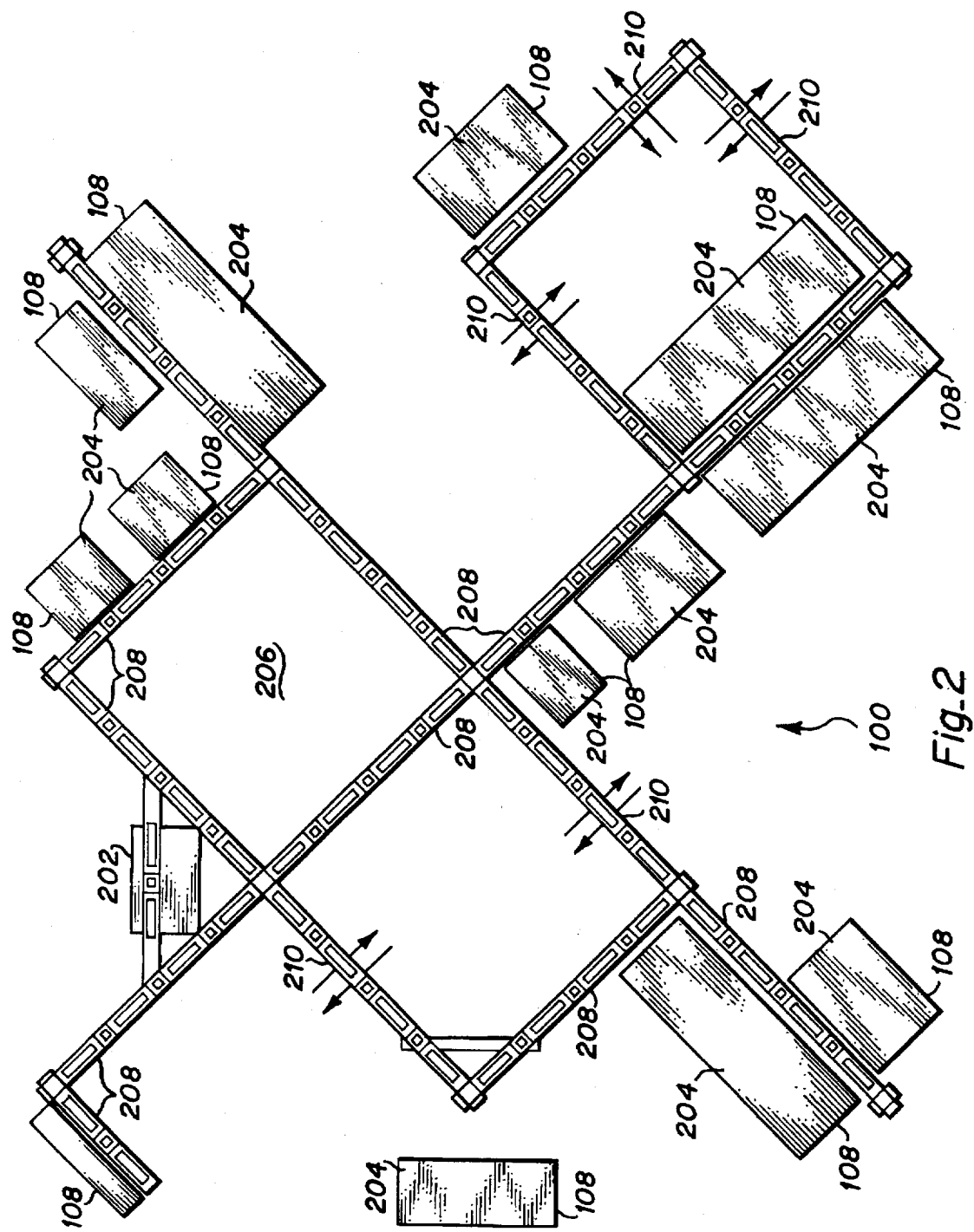
FIG. 2 is a typical floor plan for an assembled trade show exhibit booth similar to FIG. 1.

The present invention provides a temporary structural frame and includes components providing for rapid assembly and disassembly of a large size multiple level and configuration trade show exhibit booth.

FIG. 1 illustrates an exhibit booth architecture of the present invention and is referred to by the general reference character 100. The architecture 100 includes a plurality of panel modules 102, a plurality of structure modules 104, a plurality of connector modules 106, and a plurality of fixture modules 108. The structure modules 104 includes a set of beams 110, a set of sills 111, and a set of posts 112. The connector modules 106 includes a cap connector hub 114, a central connector hub 116, and a post sill connector hub 118. The cap connector hub 114 may connect horizontally to up to four beams 110 and vertically downward with one post 112. The central connector hub 116 may connect horizontally to up to four beams 110 and vertically upward and downward with posts 112. The post sill connector hub 118 may connect horizontally to up to four beams 110 and vertically upward with one post 112. The column 120 includes one sill connector hub 118, one central connector hub 116, one cap connector hub 114, and two posts 112.

FIG. 2 is a floor plan 200 for the exhibit architecture 100 that a booth architect may draw. The panel modules 102, structure modules 104, connector modules 106, and fixture modules 108 are designed to fit to a standardized grid of six inches by one hundred eighteen inches (one hundred fifty two centimeters by three meters) in order to minimize the number of joints, provide for large-scale structural development and maximize the flexibility in the arrangement of the booth 100. The floor plan 200 may provide for a presentation area 202, a plurality of product display areas 204, and a company name display area/storage/electrical power area 206. The floor plan 200 may further include walls 208 or pass-throughs 210. A pass-through 210 allows a show attendee or exhibitor to walk from one area to another within the booth 100. The panel modules 102, structural modules 104, and connector modules 106 can provide for the walls 208 and the pass-throughs 210.

Figure 3:
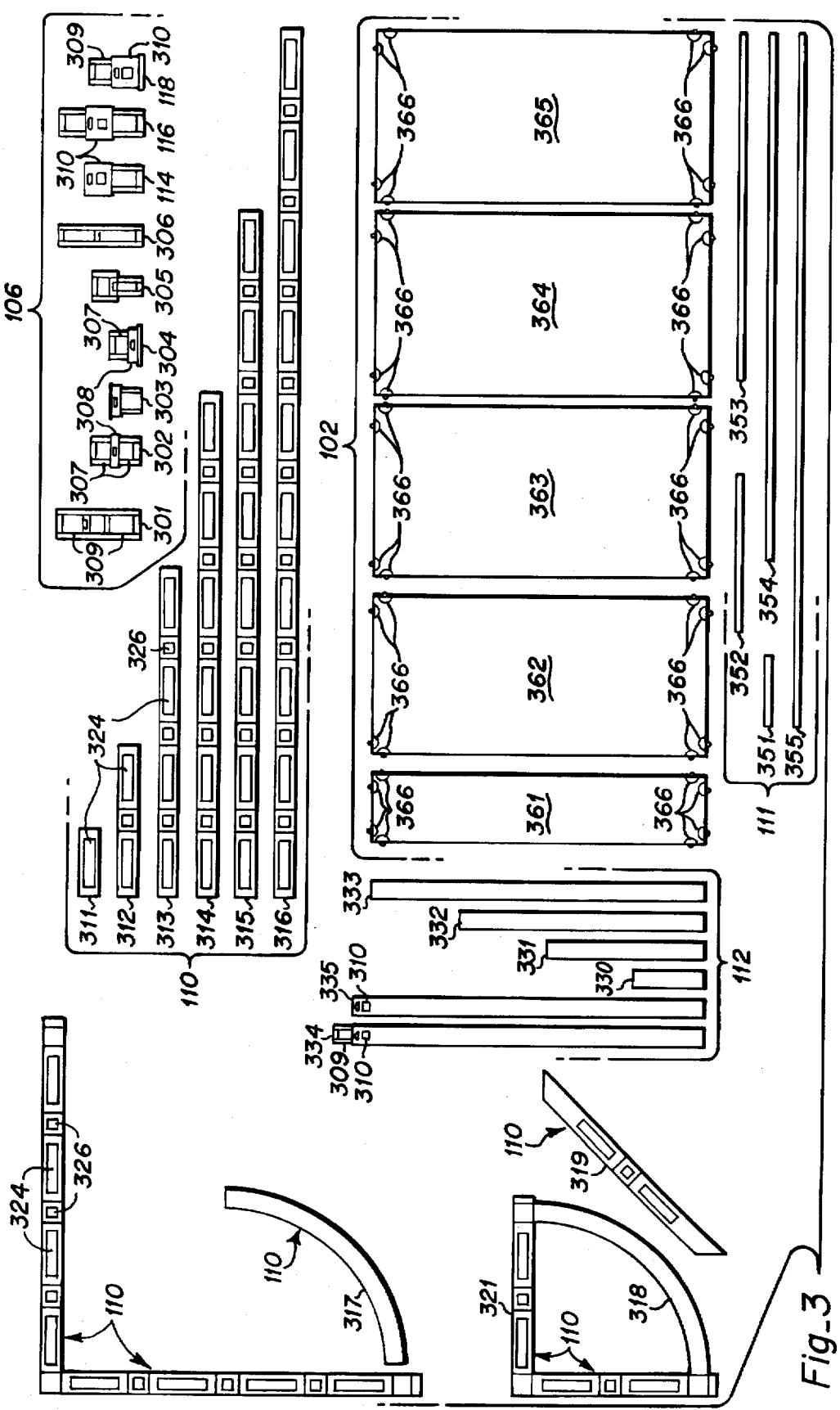
FIG. 3 is a reduced view of the building components of FIG. 1.

FIG. 3 illustrates a selection of components to make up the panel modules 102, structural modules 104, and connector modules 106 included in the architecture 100.

The connector modules 106 includes the sill connector hub 118, the central connector hub 116, the cap connector hub 114, a hub joint connector 301, a joint sill connector 302, a cap sill connector 303, a foot sill connector 304, a beam/post connector 305, and a beam joint connector 306. The sill connectors 302–304 each include a sleeve or sleeves 307 and a sill joint 308. The connector hubs 114, 116, and 118 include a sleeve or sleeves 309 and a hub joint 310. The connector modules 106 may further include other connector types such as side hub caps, beam caps and post caps (not illustrated in FIG. 3). The hub joint 310 of the connector hubs 114, 116, and 118 may provide a connection for up to four beams. The sleeve 309 of the connector hubs 114, 116, and 118 connects to one of the posts 112. The sill joint 308 of the sill connectors 302–304 may provide a connection for up to four sills. The sleeve 307 of the sill connectors 302–304 also connects to one of the posts 112.

The structural modules 104 includes beams 110, posts 112, sills 111. Beams 110 includes a plurality of straight beams 311–316 of various lengths, a plurality of arches 317–318, a plurality of slant beams 319, and a plurality of angle beams 320–321. The angle beams 320 and 321 comprise of a pair of straight beams from the group 311–316 joined by a hub joint 310. Beams 110 are generally used in the upper portions of the architecture 100 but may also be used along the base to provide greater support. The straight beams 311–316, slant beams 319 and angle beams 320–321 may be made from a hollow metallic extrusion that is preferably made of aluminum to reduce the weight. The extrusion used to manufacture these beams is shaped as a hollow six inch by six inch square prism of varying lengths and incorporates a plurality of large oval openings 324 and 326 and small narrow oval openings 327 and 328 (see FIG. 5) in its top and bottom surfaces. The large oval openings 324 and 326 provide for ease of routing electrical cables or wiring through the beam while the small narrow oval openings 327 and 328 are for coupling things to the beam such as the panel modules 102. The dimensions of straight beam 311 are approximately six inches wide by six inches high by twenty-two inches long. The dimensions of straight beam 312 are approximately six inches wide by six inches high by fifty inches long. The dimensions of straight beam 313 are approximately six inches wide by six inches high by one-hundred-six inches long. The dimensions of straight beam 314 are approximately six inches wide by six inches high by one-hundred-sixty-two inches long. The dimensions of straight beam 315 are approximately six inches wide by six inches high by two-hundred-eighteen inches long. The dimensions of straight beam 314 are approximately six inches wide by six inches high by two-hundred-seventy-four inches long.

Posts 112 includes a plurality of straight posts 330–333 of various lengths, a sleeve post 334, and a connector post 335. Straight posts 330–333 are made of a hollow metallic extrusion which is preferably aluminum. Sleeve post 334 is also made of a hollow metallic extrusion and includes an integrated sleeve 309 and hub joint 310. Connector post 335 is also made of a hollow metallic extrusion and includes an integrated hub joint 310. The hollow metallic extrusion is preferably made of aluminum to reduce the weight and is shaped as a hollow six inch by six inch square prism of varying lengths. The dimensions of straight post 330 are approximately six inches wide by six inches high by twenty-two inches long. The dimensions of straight post 331 are approximately six inches wide by six inches high by fifty inches long. The dimensions of straight post 332 are approximately six inches wide by six inches high by seventy-eight inches long. The dimensions of straight post 332 are approximately six inches wide by six inches high by one-hundred-six inches long. The dimensions of sleeve post 334 are approximately six inches wide by six inches high by one-hundred-twelve inches long without the sleeve height. The dimensions of connector post 335 are approximately six inches wide by six inches high by one-hundred-twelve inches long.

Sills 111 may be of varying lengths such as illustrated by a variety of sills 351–355. Sills 111 may be mounted in different locations but are mainly found around the bottom and top portions of the architecture 100. Sills 111 are also made of a hollow metallic extrusion which is preferably aluminum to reduce its weight. The shape of the hollow metallic extrusion is a hollow rectangular prism of varying lengths. Sills 111 include the small narrow oval openings 327 and 328 (see FIG. 5) for coupling to the panel modules or other items. The dimensions of sill 351 are approximately six inches wide by two inches high by twenty-two inches long. The dimensions of sill 352 are approximately six inches wide by two inches high by fifty inches long. The dimensions of sill 353 are approximately six inches wide by two inches high by one-hundred-six inches long. The dimensions of sill 354 are approximately six inches wide by two inches high by one-hundred-sixty-two inches long. The dimensions of sill 353 are approximately six inches wide by two inches high by two-hundred-eighteen inches long.

Panel modules 102 includes a plurality of wall panels 361–365. The dimensions of wall panel 361 are approximately one inch thick by twenty-two inches wide and one hundred-six inches high. The dimensions of wall panel 362 are approximately one inch thick by fifty inches wide and one hundred-six inches high. The dimensions of left wall panel 363 and right wall panel 365 is approximately one inch thick by fifty-three inches wide and one hundred-six inches high. The dimensions of central wall panel 364 are approximately one inch thick by fifty inches wide and one hundred-six inches high. Each wall panel 361–365 includes two wall connectors 366 at each corner. The position at the corner of the wall connectors 366 slightly varies for the larger wall panels 363–365. The wall panels 361–365 are constructed similarly to wall panels for office cubicles with the exception of the type of wall connectors 366.

Figure 4:
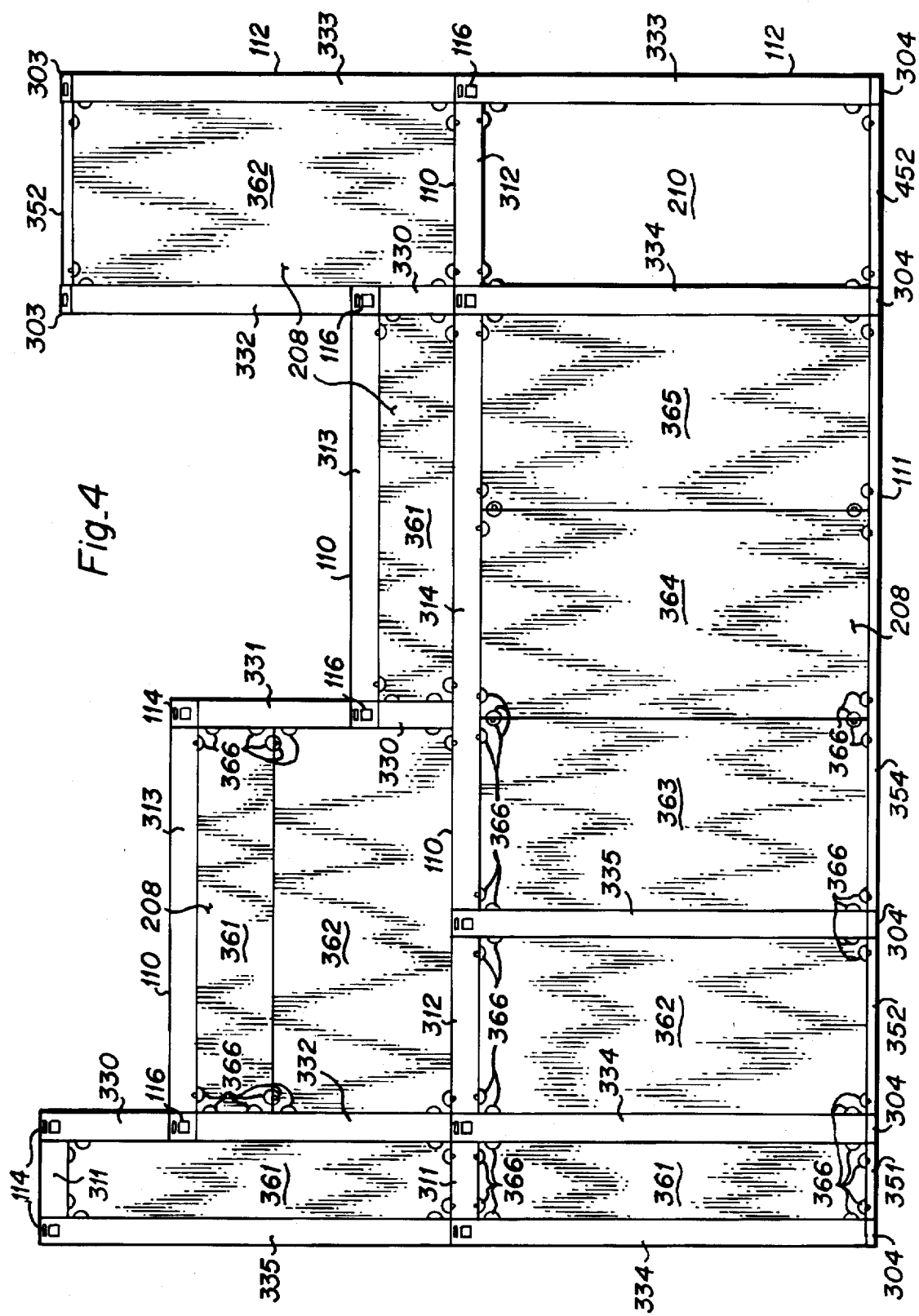
FIG. 4 is a side view of an assembled wall of the trade show exhibit booth of FIG. 1.

FIG. 4 illustrates a side view of a portion of the architecture 100. As illustrated in FIG. 4, wall 208 includes wall panel 361, wall panel 362, and wall panels 363–365 coupled together. Wall panels 361–365 are coupled to the sills 111, the posts 112, and beams 110 through the wall connectors 366. To couple the beams 110, posts 112, and sills 111 together the connector modules 106 may be used which includes the sill connector hubs 118, central connector hubs 116, cap connector hubs 114, hub joint connectors 301, joint sill connectors 302, cap sill connectors 303, foot sill connectors 304, beam/post connectors 305, and beam joint connectors 306. For example consider the construction of the pass-through 210. A door sill 452 may be coupled to two foot sill connectors 304. The post 333 may be slid over the sleeve 307 of the right foot sill connector 304 while post 334 is slid over the sleeve 307 of the left foot sill connector 304. Central connector hub 116 can have its lower sleeve 309 placed inside the post 333 and the beam 312 can be attached to the post 334 and the central connector hub 116. The door sill 452 is typically thin so that people may enter and exit by way of the pass-through 210 without tripping.

FIG. 5 illustrates an exploded view of a column 500. Column 500 includes the cap connector hub 114, the central connector hub 116, the foot sill connector 304, and two posts 333. One post 333 is between hub 114 and 116 and the other is between hub 116 and connector 304. In FIG. 5 the hub joints 310 and sleeves 309 of the connector hubs 114 and 116 are more clearly illustrated in three dimensions. The sill joint 308 and sleeve 307 are also more clearly illustrated in the three dimensional illustration of the sill connector 304. The sill joint 308 and the hub joint 310 are four sided joints such that four sills 111 or four straight beams 311–316 can respectively be connected. In FIG. 5 the cap connector hub 114 is connected to beam 314, beam 315, side hub cap 501, and sleeve 309 slides into the inside of post 333. The central connector hub 114 is connected to beam 313, beam 314, and beam 315, and the lower sleeve 309 slides into the inside of the upper post 333 while the lower post 333 slides over the upper sleeve 309. The foot sill connector 304 is connected to sill 351, sill 352, sill 353, and lower post 333 slides over the sleeve 307.

Referring to FIGS. 5 and 6A–6E, the sill joints 308 and hub joints 310 include male friction fit connectors 510 in order to make the connections to the sills 111 and beams 110. The male friction fit connector 510 includes a male double wedge connector 512 and a female wedge shim 514. The female wedge shim 514 has a u-channel cutout 515 in its wedge that creates a forked tongue having two prongs 516 and 517. To assemble the friction fit connector in joints 308 or 310, the double wedge connector 512 is inserted into a connector slot 518 that is found in each face of the sill joints 308 and the hub joints 310. The wedge shim 514 is then coupled to the wedge connector 512. In the case that the friction fit connectors 510 are made of metal, the wedge shim 514 may be tag welded or epoxied to each face of the sill joint 308 or hub joint 310. FIG. 6C is a cross section of the male friction fit connector 510 assembled within a face of the hub joint 310. Each beam 110 and each sill 111 includes a female wedge connector 519 (FIGS. 6D–6E) at its end to couple to the male double wedge connector 512 of the male friction fit connector 510. Side hub caps 501 include the female wedge connector 519 as well.

To further assure that the sills 111 and beams 110 remain connected to the respective sill joints 308 or hub joints 310, the sills 111 and beams may further include a connector 520, e.g. a Norse™ "S" connector. The S connector 520 has an retractable S hook 522 that can be rotated by an allen wrench 524. Allen wrench 524 is about a one-forth of an inch hexadecimal wrench. An allen wrench hole 526 is provided in the upper and lower surfaces of the sills 111 and beams 110 near each end so that the allen wrench 524, or special (custom) allen wrench adaptor for ratchet wrench, can reach the S connector 520 and open or close it. The holes 526 located top and bottom of beam are circular with an approximate dimension of three-eights inches in diameter. In each face of the four sided sill joint 308 and hub joint an S latching slot 528 is provided so that the S hook 522 of the S connector 520 can hook into the slot. S slot 528 is an oval shaped hole approximately one and five-eights inches wide and five-sixteenths of an inch high. The S latching slot 528 is positioned in each face of the sill joints 307 and hub joints 310 so that the latching slot S hook 522 will properly catch and hook into the face of the joint. The S connector 520 assures that the sill 111 or beam 110 is connected to the sill joint 308 or the hub joint 310 and is locked in place and will not be dislodged.

As illustrated in FIGS. 5 and 6D the female wedge connector 519 is fastened to beam 315. The female wedge connector 519 is shaped somewhat similar to the wedge shim 514 but has a larger u-channel cutout 530 and an upper coupling surface 532. Wedge connector 519 is L-angle shaped and cutout 530 creates a forked tongue with two wedged prongs 534 and 536. A front surface 601 of the wedge connector 519 surrounding the u-channel cutout 530 is vertical and flat. A back surface 602 of the wedge connector surrounding the u-channel cutout 530 is wedge shaped. The front surface 601 of the connector mates with the outside surface of the sill joint 308 or hub joint 310. Wedge connector 519 further includes two holes 537 through which a pair of allen screws 538 may pass and a pair of star washers and nuts 540 may be used to fasten it to the sill 111, beam 110, or cap 501. A pair of tapered holes 542 are drilled near the end of each sill 111, beam 110, and cap 501 to allow the tapered head of the allen screws 538 to rest flush below the surface. The upper coupling surface 532 that mates with the beam is rectangularly shaped and its dimensions are approximately three and three-fourths inches wide and one and three-eights inches high. The thickness of the surface 532 is approximately one fourth of an inch. Cutout 530 is u-channel shaped providing an approximate separation between the wedged prongs 534 and 536 at the lower edge of two and one-half inches and two and one-sixteenth inches at the separation point of the two prongs 534 and 536. The thickness of the prong at the separation point is five-sixteenths of an inch and narrows to three-sixteenths of an inch at the lower edge. The thickness of the wedge connector 519 tapers down to properly mate with the friction fit connector 510. To reduce weight the wedge connector 519 is preferably made of aluminum.

Referring to FIG. 6A, the male double wedge connector 512 is alum cast fabricated out of one piece of material and has three major sections to it. The major sections are a front wedge 604, a central body 605, and a back wedge 606. The front wedge 604 and back wedge 606 are shaped like vertical spoilers or wings. The front wedge 604 is rectangular in shape having dimensions of approximately one and one-sixteenth inches high, two and seven-eights inches wide, five-eights of an inches thick at its base edge, one-fourth of an inch at its midpoint and one-thirty-seconds of an inch at its top edge. An outside surface 608 of the front wedge is flat and vertical to the horizon while an inside surface 609 of the front wedge 604 smoothly tapers down towards the top edge on an approximate angle of five degrees from the vertical. The back wedge 606 is also rectangular in shape and has approximate dimensions of seven-eights of an inch high, fifteen-sixteenths of an inch wide, one-fourth of an inch thick at its base edge, seven-thirty-seconds of an inch at its midpoint and three thirty-seconds of an inch at its top edge. The inside surface 610 of the back wedge 606 smoothly tapers down toward the top edge on an angle of approximately ten degrees from the vertical. At the base edge of the back wedge 606 an outside surface 611 is rounded off and angles away from the vertical on an angle of approximately two degrees.

The central body 605 includes a first trapezoidal prism 612, an oval-shaped prism 614, and a second trapezoidal prism 616. The front surface of the first trapezoidal prism 612 is molded into the back surface of the front wedge 604 and remains exposed beyond the surface of the sill joints 308 or hub joints 310. The dimensions of the first trapezoidal prism are approximately two and three-eights inches wide along the base edge, two and one-sixteenths inches wide along its top edge, thirteen-sixteenths of an inch high along its right and left edges, three-sixteenths of an inch thick at its base edge, and five-sixteenths of an inch thick at its top edge. The base of the first trapezoidal prism 612 is aligned with the base of the front wedge 604.

The oval-shaped prism 614 is somewhat rectangular looking but has rounded corners such that it fits into the connector slot 518 that is found in each face of the sill joints 308 and the hub joints 310. The oval-shaped prism 614 is molded into the back surface of the first trapezoidal prism 612 at its frontal surface and is molded into the front surface of the second trapezoidal prism 616 at its back surface. Connector slot 518 is also somewhat oval-shaped and is approximately two and three-eights inches wide by nine-sixteenth inches high. The dimensions of the oval-shaped prism 614 are approximately two and one-eighth inches wide, one-half of an inch high, and one-eighth of an inch thick. The thickness of the oval-shaped prism 614 matches the thickness of the material used to create the mating faces of the sill joints 308 and hub joints 310. The base of the oval-shaped prism 614 is three-sixteenths of an inch above the base of the front wedge 604 and the first trapezoidal prism 614 and is otherwise centered on the back surface of the prism 614.

The second trapezoidal prism 616 is molded into the back surface of the oval shaped prism 614 at its front surface and is molded to the inside surface of the back wedge 606 at its back surface. The dimensions of the second trapezoidal prism 616 are approximately one and five-sixteenths inches wide along the base edge, one and one-eighth inches wide along its top edge, one-half of an inch high along its right and left edges, one-fourth of an inch thick at its base edge, and five-sixteenths of an inch thick at its top edge. The base of the second trapezoidal prism 612 is aligned with the base of the oval-shaped prism 614 and the base of the back wedge 606.

The female wedge shim 514 couples with the male double wedge connector 512 and the inside surface of the sill joint 308 or hub joint 310. Referring to FIG. 6B, the wedge shim 514 is similar to the wedge connector 519 but has a majority of an upper section 632 cutoff as compared to the connection surface 532 of the wedge connector 519. A front surface 634 of the shim 514 surrounding the u-channel cutout 515 is vertical and flat. A back surface 636 of the shim surrounding the u-channel cutout 515 is wedge shaped. The front surface 634 of the shim 514 mates with the inside surface of the sill joint 308 or hub joint 310 while the back surface 636 mates with the surface 610 of the wedge connector 512. The u-channel cutout 515 and the wedged prongs 516 and 517 of the shim couples respectively with the second trapezoidal prism 616 and back wedge 606 of the wedge connector 512. FIG. 6C illustrates the wedge shim 514 coupled to the wedge connector 512. Referring to FIG. 5, cutout 515 is u-channel shaped but smaller than u-channel cutout 530 and provides separation between the wedged prongs 516 and 517. At the point of separation the prongs 516 and 517 are approximately one and one-eighth inches apart and at the edge the prongs are one and seven-sixteenths inches apart. The thickness of the prong at the separation point is approximately five-sixteenths of an inch and narrows to approximately three-sixteenths of an inch at the prong tips. The thickness of wedge shim 514 tapers down to properly mate with the male double wedge connector 512. To reduce weight the wedge shim 514 is preferably made of aluminum.

Referring to FIGS. 5 and 6C–6E, female wedge connector 519 may be coupled to the double friction fit connector 510. The u-channel cutout 530 and the wedged prongs 534 and 536 of the wedge connector 519 couples respectively with the first trapezoidal prism 612 and front wedge 604 of the wedge connector 512. The coupling of the wedges holds the beams 110, sills 111, or caps 501 to the surface of the sill joint 308 or hub joint 310 to help keep horizontal movement to a minimum. The coupling of the u-channel cutout 530 with the first trapezoidal prism 612 helps to keep the beam 110, sill 111, or cap 501 from laterally moving side to side against the surface of the sill joint 308 or hub joint 310. The front surface 601 of the wedge connector 519 mates with the outside surface of the sill joint 308 or hub joint 310 while the back surface 602 mates with the surface 609 of the wedge connector 512. FIG. 6E shows how the female wedge connector 519 couples to the double friction fit connector 510.

Figure 7:
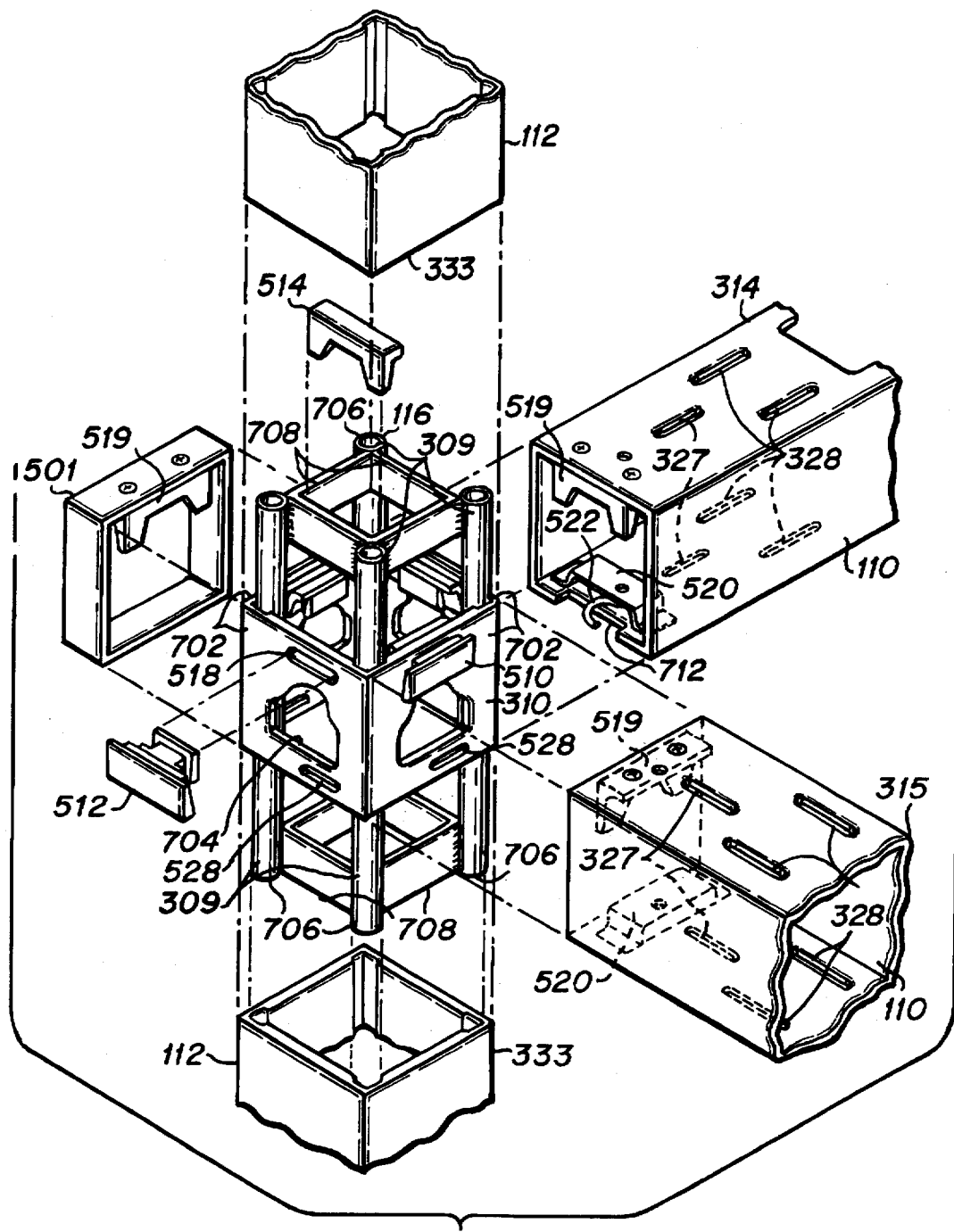
FIG. 7 is an exploded view of a central connector hub of FIG. 5.

Referring to FIG. 7, a central hub 116 is coupled to side hub caps 501, beam 314, beam 315, and two posts 333. The hub joint 310 has four mating faces 702. The hub joint 310 is a square hollow custom extension prism having a set of four faces with holes or slots cut into faces 702. The size of the hub joint 310 square hollow prism is approximately six inches by six inches. Each mating face 702 is also six inches wide by six inches high with three holes cut into each mating face 702, including the connector slot 518, the S slot 528, and an electrical hole 704. The electrical hole 704 allows electrical conductors to be fed through the connector and down the beams 110. Hole 704 is rectangularly shaped at bottom and tapers into a semicircle at its top. At its base, hole 704 is three and one-half inches wide and is approximately two and three-fourths inches high to the top of the semicircle. The sleeves 309 of the central hub 116 include four hollow cylindrical rods 706 connected near their midpoints to the internal corners of the hub joint 310. They are preferably connected by welding aluminum rods to an aluminum joint. A pair of square prism shoulders 708 are then connected near each end of each rod 706 and within the interior area formed by the rods 706. Preferably the shoulders 708 are aluminum and connected to the rods 706 by welding the rod to each external corner of the shoulder 708. The dimensions of cylindrical rods 706 are approximately one inch outer diameter, six-eights of an inch inner diameter, one-eights inch thick, and 17.5 inches high. The shoulders 708 are approximately four inch by four inch square hollow prisms with a height of one and one half inches. The hub joint 310 is approximately a six by six inch square hollow prism with a height of six inches. The thickness of the aluminum used for the hub joint 310 and shoulders is approximately one-eighth of an inch. The joint sill connector 302 (FIG. 5) may be similarly constructed by substituting a sill joint 308 for the hub joint 310 and replacing rods 706 with ones that are ten inches in length.

As previously discussed straight beams 311–316 are approximately a six inch by six inch hollow square prism with various lengths. The thickness of aluminum that is preferably used is one-eighth of an inch thick. In order to allow for beams 110 or sills 111 to easily couple to the double friction fit connector 510 in the hub joint 310 or sill joint 308 a rectangular cutout 712 is provided in the lower surface beams 110 and sills 111 so that the beam or sill can slide over the connector 510 when it is near the mating face 702 of the hub joint 310 or sill joint 308. The rectangular cutout 712 is centered on the bottom edge of the beams 110 and sills 111 and is approximately three and one-fourth inches wide and one-half inch deep.

The small narrow oval openings 327 and 328 are positionally mirrored in the upper and lower surfaces of beams 110 and sills 111 and are rectangularly shaped with semi-circles at each end. Openings 327 are approximately one and one-fourth inches wide and five-thirty-seconds of an inch high. Opening 328 are approximately one and three-fourths inches wide by five-eights of an inch high. Openings 327 and 328 allow other items to be connected to the latching slot of beams 110 and sills 111.

Side hub cap 501 is provided to cover the mechanical connections, holes, and slots in the hub joint when no beam 110 is to be attached. Side hub cap 501 is shaped like a hollow rectangular box with an opening at one. The approximate dimensions of the cap 501 are a six inch by six inch square hollow prism and one and one-half inches in length. The thickness of the aluminum is approximately one-eighth of an inch.

Referring to FIG. 8, the foot sill connector 304 is coupled to a side sill cap 801, sill 352, sill 353, and post 333. To connect these items the female wedge connector 519 in sill cap 801, sill 352 and sill 353 is connected to the male double friction connector 510 as illustrated in FIG. 6E. The S connector 520 in the sills 352 and 353 may have the S hook 522 turned by the allen wrench 524. Foot sill connector 304 includes a base 804, the sill joint 308, and the sleeve 307. Base 804 is a solid square approximately six and one-half inches by six and one-half inches and is one-fourth of an inch thick. Base 804 is preferably made of aluminum for strength and low weight. Sill joint 308 has four mating faces 806 with leveling adjustors. Four mating faces of sill joint 308 form a square hollow prism approximately six inches by six inches square and two inches high. Each mating face 806 is rectangularly shaped and is approximately six inches wide by two inches high. Each mating face 806 includes the connector slot 518 and the S slot 528. The sleeve 307 of the foot sill connector 308 include four hollow cylindrical rods 810 connected at one end to the internal corners of the sill joint 308 such that there ends are flush with the edge of the sill joint. The rods 810 are preferably connected by welding aluminum rods to an aluminum sill joint to form a square prism shoulder 708 within the interior of the rods 810 and near the end of each rod 810. Preferably the shoulder 708 is aluminum and is connected to the rods 810 by welding each rod to each external corner of the shoulder 702. The dimensions of cylindrical rods 810 are approximately one inch outer diameter, six-eights of an inch inner diameter, one-eights inch thick, and 11¾ inches high. The shoulders 812 are approximately four inch by four inch square hollow prisms with a height of one and one half inches. The sill joint 308 is approximately a six by six inch square hollow prism with a height of two inches. The thickness of the aluminum used for the sill joint 308 and shoulder 812 is approximately one-eighth of an inch. Sill connector hub 118 may be similarly constructed by substituting a hub joint 310 for the sill joint 308 and replacing rods 810 with ones that are twelve inches in length.

Sills 111 include the small narrow openings 327 and 328 in the top and bottom surfaces of the sill. Sills 111 further include the allen wrench holes 526 in the top and bottom surfaces. Sills 111 also have the cutout 712 for easily coupling the sills 111 to the joint 308 when the end of the sill is very close to the surface of the joint.

Side sill cap 801 is provided to cover the connections, holes, and slots in the sill joint when no sill 111 is to be attached to the face 806. Side sill cap 501 is shaped like a hollow rectangular box with an opening at one. The approximate dimensions of the cap 801 are a six inch by two inch rectangular hollow prism and one and one-half inches in length. The thickness of the aluminum is approximately one-eighth of an inch.

Referring to FIG. 9, the cap connector hub 114 is coupled to a side hub cap 501, beam 314, beam 315, and post 333. To connect these items the female wedge connector 519 in each is connected to the male double friction connectors 510 in the cap connector hub 114 as illustrated in FIG. 6E. The S connector 520 in the beams 314 and 315 may have the S hook 522 turned by the allen wrench 524. The hub joint 310 has four mating faces 702. The hub joint 310 is a square hollow prism with holes or slots cut into its faces 702. The size of the hub joint 310 square hollow prism is approximately six inches by six inches. Each mating face 702 is also six inches wide by six inches high. Three holes may be cut into each mating face 702 including the connector slot 518, the S slot 528, and the electrical hole 704. The electrical hole 704 allows electrical conductors to be fed through the connector and through the beams 110 and up/down posts 112. The sleeve 309 of the cap connector hub 114 includes four hollow cylindrical rods 806 connected at one end to the internal corners of the sill joint 308 flush with the top edge. Alluminum rods 806 are preferably welded to the aluminum sill joint 308. A of square prism shoulder 708 is then connected near the opposite end of each rod 806. Preferably the shoulders 708 are aluminum and are connected about the interior of the rods 806 by welding the rod to each external corner of the shoulder 708. The dimensions of cylindrical rods 806 are approximately one inch outer diameter, six-eights of an inch inner diameter, one-eights inch thick, and 11¾ inches high. The shoulder 708 is approximately a four inch by four inch square hollow prism with a height of one and one half inches. The hub joint 310 is approximately a six by six inch square hollow prism with a height of six inches. The thickness of the aluminum used for the hub joint 310 and shoulders is approximately one-eighth of an inch. The cap sill connector 303 may be similarly constructed by substituting a sill joint 308 for the hub joint 310 and replacing rods 812 with ones that are 11¾ inches in length.

Although the present invention has been described in terms of the presently preferred embodiment(s), it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A structural connector hub (114, 116, 118, 302, 303, or 304) for connecting to posts (112), beams (110), sills (111), or caps (501 or 801) having a female wedge connector (519) coupled inside at an open end to a backside of a top surface, the structural connector comprising:

a first sleeve (307 and 309) for accepting and coupling to posts (112); and a joint (308 or 310) for coupling to a plurality of beams (110), sills (111) or caps (501 or 801), the joint (308 or 310) comprising a rectangular shaped hollow prism having four connecting faces (702 or 806) with a first slot (518) in at least one of said connecting faces;

a double wedge connector (512) coupled to said first slot (518) and having a first wedge (604) coupled to one end of a central body (605) and a second wedge (606) coupled to an opposite end of said central body (605), said central body (605) coupled to said first slot (518) of the prism; and a wedge shaped shim (514) coupled to said central body (605) and said second wedge (606) for holding the double wedge connector (512) coupled to said first slot (518).

2. The structural connector hub of claim 1 wherein said central body (605) of the double wedge connector (512) has a second trapezoidal prism shaped region (616), and said wedge shaped shim (514) has a U-shaped cutout (515) for coupling to said second trapezoidal prism shaped region (616) and a pair of wedged prongs (516 and 517) for coupling to said second wedge (606) of the double wedge connector (512).

3. The structural connector hub of claim 1 wherein said central body (605) of the double wedge connector (512) has an oval-shaped prism region (614) for coupling to said first slot (518).

4. The structural connector hub of claim 1 wherein the first sleeve (307 or 309) further comprises four cylindrical rods (706 or 810) respectively coupled at one end to each inside corner of said rectangular shaped hollow prism of the joint (308 or 310), and a shoulder (708 or 812) having a hollow rectangular prism shape with four external corners, opposite ends of the four cylindrical rods (706 or 810) respectively coupled to each external corner.

5. The structural connector hub of claim 1 further comprising a second sleeve (307 or 309) aligned with the first sleeve (307 or 309) for accepting and coupling to posts (112).

6. The structural connector hub of claim 5 wherein the first and second sleeve (307 or 309) further comprise four cylindrical rods (706 or 810) respectively coupled near middle of the rods (706 or 810) to each inside corner of said rectangular shaped hollow prism of the joint (308 or 310), and a first shoulder (708 or 812) and a second shoulder (708 or 812) each having a hollow rectangular prism shape with four external corners, one end of the rods (706 or 810) respectively coupled to each external corner of the first shoulder (708 or 812) and the opposite end of the rods (706 or 810) respectively coupled to each external corner of the second shoulder (708 or 812).

7. The structural connector hub of claim 1 wherein each said connecting face (702 or 806) further has an electrical opening (704) for routing electrical cables through the structural connector hub.

8. The structural connector hub of claim 1 wherein each said connecting face (702 or 806) further has a second slot (528), and an S lock having an S hook (522) for coupling said sills to said second slot (528).

9. The structural connector hub of claim 1 wherein the first sleeve (307 or 309) and the joint (308 or 310) are made of aluminum.

10. A structural connector hub (114, 116, 118, 302, 303, or 304) for connecting to posts (112), beams (110), sills (111), or caps (501 or 801) having a female wedge connector (519) coupled inside at an open end to a backside of a top surface and having a U-shaped cut-out (530) and a pair of wedged prongs (534 and 536), the structural connector hub comprising:

a first sleeve (307 and 309) for accepting and coupling to posts (112); and a joint (308 or 310) for coupling to a plurality of beams (110), sills (111), or caps (501 or 801), the joint (308 or 310) comprising a rectangular shaped hollow prism having four connecting faces (702 or 806) with a first slot (518) in at least one of said connecting faces;

a double wedge connector (512) coupled to said first slot (518) and having a first wedge (604) coupled to one end of a central body (605) having a first trapezoid prism shaped region (612) adapted to be coupled to said U-shaped cut-out (530) and said pair of wedged prongs (534 and 536), and a second wedge (606) coupled to an opposite end of said central body (605) coupled to said first slot (518) of the prism; and a wedge shaped shim (514) coupled to said central body (605) and said second wedge (606) for holding the double wedge connector (512) adapted to be coupled to said first slot (518).

\* \* \* \* \*